(12) United States Patent
Tanabe et al.

(10) Patent No.: US 8,737,387 B2
(45) Date of Patent: May 27, 2014

(54) GATEWAY UNIT, COMMUNICATION SYSTEM AND COMMUNICATION METHOD

(75) Inventors: Motofumi Tanabe, Tokyo (JP); Koji Sato, Tokyo (JP); Shinji Furuya, Tokyo (JP); Shingo Soma, Tokyo (JP); Tetsuya Yokotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 68 days.

(21) Appl. No.: 13/505,138

(22) PCT Filed: Oct. 30, 2009

(86) PCT No.: PCT/JP2009/068710
§ 371 (c)(1),
(2), (4) Date: Apr. 30, 2012

(87) PCT Pub. No.: WO2011/052079
PCT Pub. Date: May 5, 2011

(65) Prior Publication Data
US 2012/0218989 A1     Aug. 30, 2012

(51) Int. Cl.
*H04L 12/56* (2006.01)

(52) U.S. Cl.
USPC ........... 370/352; 370/401; 370/252; 370/235; 709/227; 709/228; 709/229

(58) Field of Classification Search
CPC .............. H04L 29/06027; H04L 47/10; H04L 47/2441; H04L 29/06; H04M 7/006
USPC ........... 370/401, 252, 352, 235; 709/227–229
See application file for complete search history.

(56) References Cited

U.S. PATENT DOCUMENTS

2008/0022000 A1*  1/2008  Furuya et al. ................. 709/228
2008/0080369 A1*  4/2008  Sumioka et al. .............. 370/229
2009/0310601 A1* 12/2009  Kawahata ..................... 370/352

FOREIGN PATENT DOCUMENTS

| JP | 2006 80847 | 3/2006 |
| JP | 2009 152973 | 7/2009 |
| WO | 2006 013618 | 2/2006 |
| WO | WO 2006/028138 A1 | 3/2006 |
| WO | 2006 051594 | 5/2006 |

OTHER PUBLICATIONS

Sato, et al, "Implementation of SIP adaptation function for Qos negotiation in NGN". IEICE Technical Report, CS 2005-46, pp. 55-62. (Nov. 2005).
International Search Report issued on Nov. 24, 2009 in PCT/JP09/068710 filed on Oct. 30, 2009.

(Continued)

*Primary Examiner* — Charles C Jiang
*Assistant Examiner* — Jamal Javaid
(74) *Attorney, Agent, or Firm* — Oblon, Spivak, McClelland, Maier & Neustadt, L.L.P.

(57) ABSTRACT

A gateway unit which relays communication between a call control network and a terminal having no call control function. The gateway unit includes: a session control section which substitutively performs call control processing in call control communication performed by the terminal by way of the call control network and reports a band required for the call control communication to the call control network; and a band adjustment section which determines an updated value of a band of the call control communication based on a communication packet in the call control communication, received from the terminal. The session control section reports the updated value to the call control network as the band required by the call control communication.

9 Claims, 15 Drawing Sheets

(56) References Cited

OTHER PUBLICATIONS

Office Action issued Jan. 29, 2013 in Japanese Patent Application No. 2011-538177 with English language translation.

Kouji Sato, et al., "Implementation of SIP adaption function for QoS negotiation in NGN [in Japanese]", Information and Communication Engineers, IEICE technical report, 2 pages with English abstract.

* cited by examiner

FIG.3

| No. | FLOW CONDITION ||||||| SESSION CONTROL PARAMETER |||||
|---|---|---|---|---|---|---|---|---|---|---|---|
| | IP ADDRESS || PROTO-COL | PORT NUMBER || DESTINATION SIP-URI | MEDIA TYPE | TRANSPORT PROTOCOL | MEDIA FORMAT | MEDIA DIRECTION | BAND INITIAL VALUE |
| | SENDER | DESTINATION | | SENDER | DESTINATION | | | | | | |
| 1 | * | 1.2.3.4 | TCP | * | 80 | foo@example.com | application | TCP | http | sendrecv | 200 |
| 2 | * | 5.6.7.8 | UDP | * | 1234 | bar@example.net | audio | RTP/AVP | 0 | sendonly | 100 |
| .. | | | | | | | | | | | |
| N | | | | | | | | | | | |

FIG.6

```
UPDATE sip:85011bf9a84ecf6f@121.0.50.50 SIP/2.0
Via: SIP/2.0/UDP 1.1.1.1;branch=z9hG4bK29ffa9907d949bd9
Max-Forwards: 70
From: <sip:foo@example.com>;tag=aaaaa
To: <sip:bar@example.com>;tag=bbbbb
Call-ID: ccccc@1.1.1.1
CSeq: 4 UPDATE
Contact: <sip:foo@1.1.1.1>
Supported: 100rel, timer
Allow: INVITE, CANCEL, ACK, BYE, PRACK, UPDATE
Session-Expires: 300;refresher=uas
Content-Type: application/sdp
Content-Length: 146 v=0
o=- 1234567890 1234567891 IN IP4 1.1.1.1
s=-
c=IN IP4 1.1.1.1
t=0 0
m=audio 60000 RTP/AVP 0
a=sendrecv
a=rtpmap:0 PCMU/8000
b=AS:200
```

FIG.9

```
DESCRIBE rtsp://example.org/sample1.sdp RTSP/1.0
Cseq:1
Accept:application/sdp
 :
```

FIG.10

```
RTSP/1.0 200 OK
Server:xxxxx
Cseq:1
 ..
v=0
o=- 1234567890 1234567890 IN 1.1.1.1
s=sample1
c=IN IP4 0.0.0.0
b=AS:320
t=0 0
 ..
m=video 49170/2 RTP/AVP 96
b=AS:256
a=rtpmap:96 MP4V-ES/90000
a=fmtp:96 profile-level-id=1;config=000001B001000001B509000001000000012···
 ..
m=audio 49230 RTP/AVP 97
b=AS:64
a=rtpmap:97  MP4A-LATM/24000
a=fmtp:97 profile-level-id=1;bitrate=64000;cpresent=0;config=9122620000
```

} SDP

FIG.13

| 0 | 7 | 8 | | 15 | 16 | | 23 | 24 | | 31 |
|---|---|---|---|---|---|---|---|---|---|---|
| SENDER PORT NUMBER ||||| DESTINATION PORT NUMBER ||||||
| SEQUENCE NUMBER |||||||||||
| ACKNOWLEDGMENT NUMBER |||||||||||
| HEADER LENGTH | RESERVED || URG | ACK | PSH | PST | SYN | FIN | WINDOW SIZE ||
| CHECKSUM ||||| EMERGENCY POINTER ||||||
| Kind=2 ||| Length=4 ||| MAXIMUM SEGMENT SIZE |||||
| Kind=1 (NOP) ||| Kind=3 ||| Length=3 ||| SHIFT COUNT |||

GATEWAY UNIT, COMMUNICATION SYSTEM AND COMMUNICATION METHOD

FIELD

The present invention relates to a gateway unit and a communication method in a communication system which includes a terminal having no session control function, a network for performing session control, and the gateway unit connecting to the terminal and the network and substitutively performing session control processing for the terminal.

BACKGROUND

Recently, there has been provided a network which assures a quality of service (QoS) of a communication band or the like with introducing a concept of session (hereinafter, referred to as session control network) on an Internet protocol (IP) network which is based on the best-effort. Each terminal needs to support a protocol for session control in order to connect the terminal to such a session control network and benefit from the session control. However, the existing terminals are not compatible with the session control protocol in some cases.

Accordingly, there has been suggested a method in which a gateway unit substitutively performs session control processing between an existing terminal and a session control network, where the gateway unit is present between the existing terminal incompatible with a session control protocol and the session control network (for example, see Patent Literature 1 mentioned below).

On the other hand, in the case of the gateway unit substitutively performing the session control processing, the gateway unit needs to determine band information to be reported to the session control network for communication to be performed at the time of session control. Accordingly, for example, in the technique disclosed in Patent Literature 1 mentioned below, the gateway unit beforehand stores a correspondence table which correlates flow information with band information, the flow information being identified based on a sender address, a destination address, a protocol, a sender port number, a destination port number and the like in communications between the existing terminals, the band information being to be reported in session control. Then, the gateway unit looks up the correspondence table when having detected communication to be subjected to substitutive processing of session control, and retrieves the band information corresponding to the flow information of that communication, thereby to determine the band information to be reported to the session control network.

CITATION LIST

Patent Literature

Patent Literature 1: International Publication No. 2006/051594

SUMMARY

Technical Problem

However, according to the aforementioned conventional technique, upon detection of communication to be subjected to the substitutive processing of session control, the gateway unit refers to the stored correspondence table and determines band information to be reported to the session control network. On the other hand, a band required for communication differs for each application and further, even the same applications do not necessarily require the same band. For this reason, the method for determining the band based on the flow information provided in the conventional technique had a problem that it was difficult to report the optimum required band.

The present invention was developed in view of the aforementioned circumstances. It is therefore an object of the invention to provide a gateway unit, a communication system and a communication method, which can appropriately report, to a call control network, a band value required for communication between the existing terminals to be subjected to session control, when the session control processing of the existing terminals is substitutively performed.

Solution to Problem

In order to solve the above-mentioned problem and achieve the object, the present invention provides a gateway unit for connecting a call control network for performing call control and a terminal having no call control function to relay communication between the call control network and the terminal, the gateway unit comprising: a call control unit for substitutively performing call control processing in call control communication that is communication performed by the terminal by way of the call control network, and reporting a band required by the call control communication to the call control network; and a band adjustment unit for determining an updated value of a band of the call control communication based on a communication packet in the call control communication, received from the terminal, wherein the call control unit reports the updated value to the call control network as a band required by the call control communication.

Advantageous Effects of Invention

The gateway unit according to the present invention has an advantageous effect of being capable of appropriately reporting, to a call control network, a band value required for communication between the existing terminals to be subjected to session control.

BRIEF DESCRIPTION OF DRAWINGS

FIG. 3 is an illustration showing an example of a session information table.

FIG. 6 is an illustration showing an example of an UPDATE message of SIP.

FIG. 9 is an illustration showing an example of an "RTSP DESCRIBE" message.

FIG. 10 is an illustration showing an example of an "RTSP 200 OK" response.

FIG. 13 is an illustration showing an example of header format of a TCP packet.

DESCRIPTION OF EMBODIMENTS

Now, a gateway unit, a communication system and a communication method according to the embodiments of the present invention will be described in detail below with reference to the drawings. Note that the invention is not be limited to these embodiments.

First Embodiment

Figure 1:
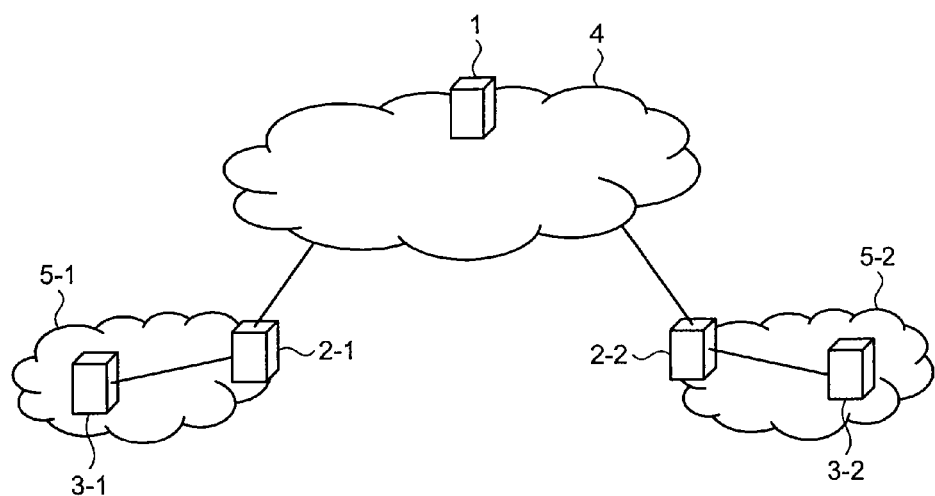
FIG. 1 is a view illustrating an example of configuration of a communication system according to a first embodiment.

FIG. 1 is a view illustrating an example of configuration of a first embodiment of a communication system according to the present invention. As shown in FIG. 1, the communication system of this embodiment is composed of: a call control network 4 which is a network for performing call control (session control) and call management (session management) using a plurality of priority classes; user networks 5-1 and 5-2 that are the existing IP networks which do not cover call control; a gateway unit 2-1 interposed between the user network 5-1 and the call control network 4; and a gateway unit 2-2 interposed between the user network 5-2 and the call control network 4.

The call control network is connected with a SIP (Session Initiation Protocol) server 1 which performs the call control and the call management. Furthermore, the user network 5-1 is connected with a terminal 3-1 that is a terminal having no call control function, and the user network 5-2 is connected with a terminal 3-2 that is a terminal having no call control function. Note that the configuration in FIG. 1 is illustrated by way of example, and the number of user networks is not limited to this, but may be any number, and the number of terminals to be connect to each user network is also not limited to this, but may be any number. Note that the gateway unit is supposedly interposed between the user network and the call control network 4 for each user network.

Figure 2:
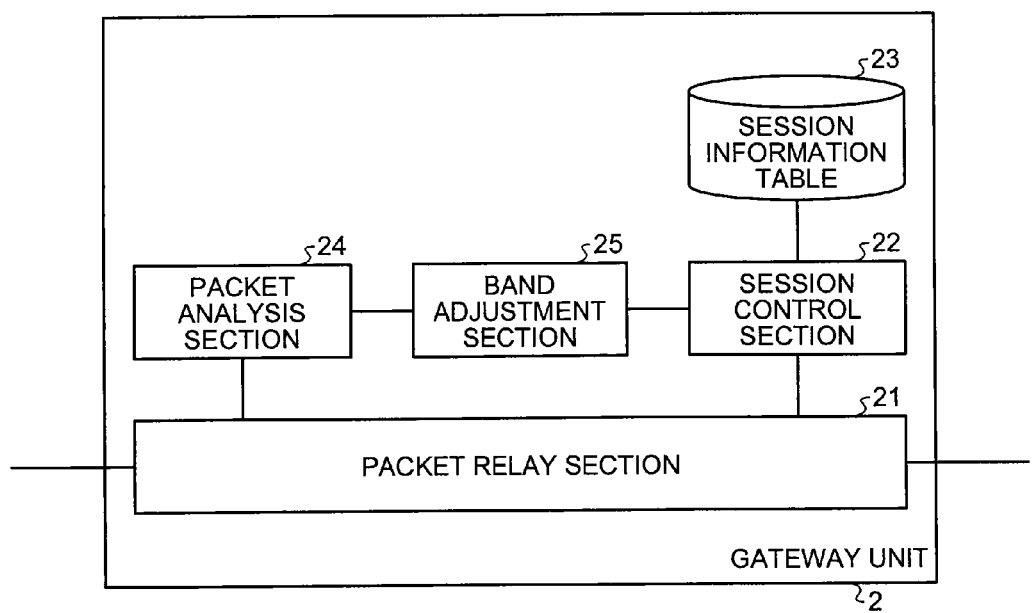
FIG. 2 is a diagram illustrating an example of functional construction of a gateway unit according to the first embodiment.

FIG. 2 is a diagram illustrating an example of functional construction of a gateway unit 2 of this embodiment (the gateway unit 2-1 or gateway unit 2-2). Note that the gateway unit 2-1 and the gateway unit 2-2 shown in FIG. 1 have the same configuration, and will be denoted by the gateway unit 2 when referring to the representative of these gateway units without being individually identified.

The gateway unit 2 includes a packet relay section 21, a session control (call control) section 22, a packet analysis section 24, and a band adjustment section 25. Furthermore, the gateway unit 2 has a session information table 23 that is a table storing communication flow conditions (flow information) to be subjected to session control and parameters for session control. The storage (memory) means for storing the session information table 23 may be included in the session control section 22 or alternatively, memory means may also be provided separately from the session control section 22.

The packet relay section 21 performs predetermined reception processing on a packet received from the call control network 4 and a user network (such as the user network 5-1 and the user network 5-2) to which the packet relay section 21 is connected. The packet relay section 21 also performs predetermined transmission processing on a packet to be sent to the call control network 4 and a user network to which the packet relay section 21 is connected. The packet relay section 21 thus relays packets between the call control network 4 and the user network to which the packet relay section 21 is connected. Furthermore, the packet relay section 21 monitors the traffic between the call control network 4 and the user network to which the packet relay section 21 is connected.

The session control section 22 takes the place of a terminal within the user network, to which the session control section 22 is connected, to perform session control processing between the call control network 4 and the terminal. Any method for session control can be employed, and by way of example, control is implemented herein using the Session Initiation Protocol (SIP).

FIG. 3 is an illustration showing an example of the session information table 23. As shown in FIG. 3, the session information table is composed of flow conditions and session control parameters. A mark "*" in the figure means that any value can be used for an item with the mark (with no limitation). The flow conditions include IP addresses of a sender and a destination, a protocol, and port numbers of the sender and the destination. The session control parameters include: a destination SIP Uniform Resource Identifier (SIP-URI) indicative of a destination on the SIP; a media type such as "audio", "video", or "application"; a transport protocol; a media format; a media direction; and a band initial value. The media format represents a payload number for Real-time Transport Protocol (RTP)/Audio Video Profile (AVP) and the MIME subtype for TCP, and the like. The media direction represents a direction of communication such as "sendrecv (send and receive)", "sendonly (send only)", or "recvonly (receive only)."

Note that the arrangement in FIG. 3 is shown only by way of example, and a configuration of the session information table 23 is not required to be limited to that in FIG. 3. The flow conditions of the session information table 23 have only to include a condition for identifying a flow to be identified, while the session control parameters have only to include a control parameter required to make setting in session control.

The packet analysis section 24 analyzes the contents of communication by referring to a header and the like of a packet being subjected to session control, then extracts a packet loss rate, as information for determining a band value required for the communication, and outputs the packet loss rate to the band adjustment section 25. The band adjustment section 25 determines a report band, which is to be reported to the call control network 4, based on the packet loss rate, and then outputs the resulting report band to the session control section 22.

Figure 4:
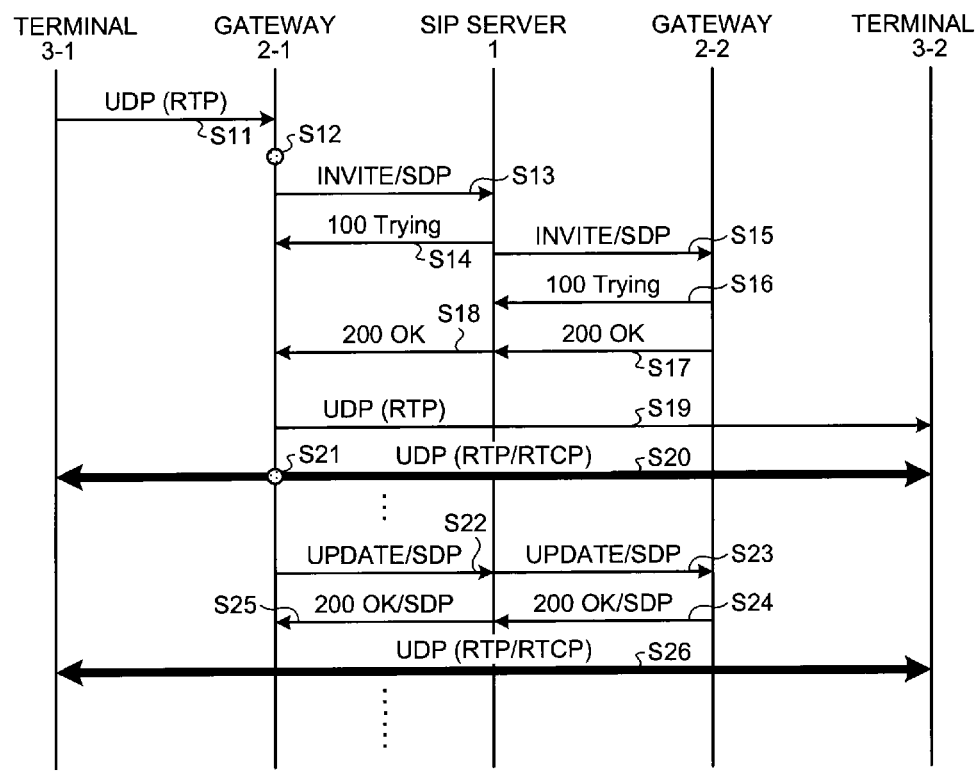
FIG. 4 is a sequence diagram illustrating an example of communication procedure according to the first embodiment.

Now, operations in this embodiment will be described. FIG. 4 is a sequence diagram illustrating an example of a communication procedure of this embodiment. Referring to FIG. 4, description will be given for the operations in this embodiment by taking, as an example, the case where the terminal 3-1 performs RTP communication with the terminal 3-2.

First, the terminal 3-1 sends, to the terminal 3-2, an initial packet (communication start packet) for the RTP communication (step S11). Note that the packet for the RTP communication is transmitted as a User Datagram Protocol (UDP) packet.

When the packet relay section 21 receives the communication start packet from the terminal 3-1, the gateway unit 2-1 suspends the relay of the packet so as to hold the packet and transfer it to the session control section 22. The session control section 22 extracts, from the received communication start packet, information corresponding to flow conditions such as the sender IP address, the destination IP address, the protocol, the sender port number and the destination port number, and retrieves the flow condition that matches the extracted information based on the session information table 23, so as to acquire session control parameters corresponding to the flow condition obtained by the retrieval (step S12).

Then, the session control section 22 of the gateway unit 2-1 creates an INVITE message that is a call connection request (session establishment request) based on the acquired session control parameters and then sends the message to the SIP server 1 (step S13). More specifically, as a QoS parameter to be reported to the call control network 4, the session control section 22 creates SDP information which describes values of the acquired session control parameters using the Session Description Protocol (SDP), and then sends the created SDP information with that information being included in the INVITE message.

Upon reception of the INVITE message, the SIP server 1 sends, back to the gateway unit 2-1, a provisional response "100 Trying" indicative of session establishment processing currently being performed (step S14), and then transfers the received INVITE message to the gateway unit 2-2 connected to the terminal 3-2 that is a communication target (step S15). The gateway unit 2-2 sends the "100 Trying" back to the SIP server 1 (step S16).

When the session establishment processing is successfully ended, the gateway unit 2-2 sends a "200 OK" response to the SIP server 1 (step S17), and upon reception of the "200 OK" response from the gateway unit 2-2, the SIP server 1 sends the "200 OK" response to the gateway unit 2-1 (step S18).

Upon detection of the establishment of a communication channel by receiving from the SIP server 1 the "200 OK" response transmitted in the step S18, the session control section 22 of the gateway unit 2-1 commands the packet relay section 21 to restart the relay processing of packets, and accordingly the packet relay section 21 transfers the suspended packet (the packet transmitted in the step S11) to the terminal 3-2 (step S19).

Subsequently, the RTP and RTCP (RTP Control Protocol) communication is performed between the terminal 3-1 and the terminal 3-2 by way of the gateway unit 2-1, the SIP server 1 and the gateway unit 2-2 (step S20).

During the communication in the step S20, the gateway unit 2-1 allows the packet relay section 21 to relay the RTP/RTCP communication packet transmitted from the terminal 3-1. However, the packet relay section 21 passes, to the packet analysis section 24, the RTP/RTCP communication packet received from the terminal 3-1, which is to be relayed. Then, the packet analysis section 24 analyzes the packet, and if the received packet is an RTCP Sender Report packet or Receiver Report packet, then extracts the packet loss rate from the corresponding report block of the packet and passes the resulting packet loss rate to the band adjustment section 25, so that the band adjustment section 25 determines a band to be reported, based on the packet loss rate, as shown by a report band updating method (to be discussed later) (step S21).

Figure 5:
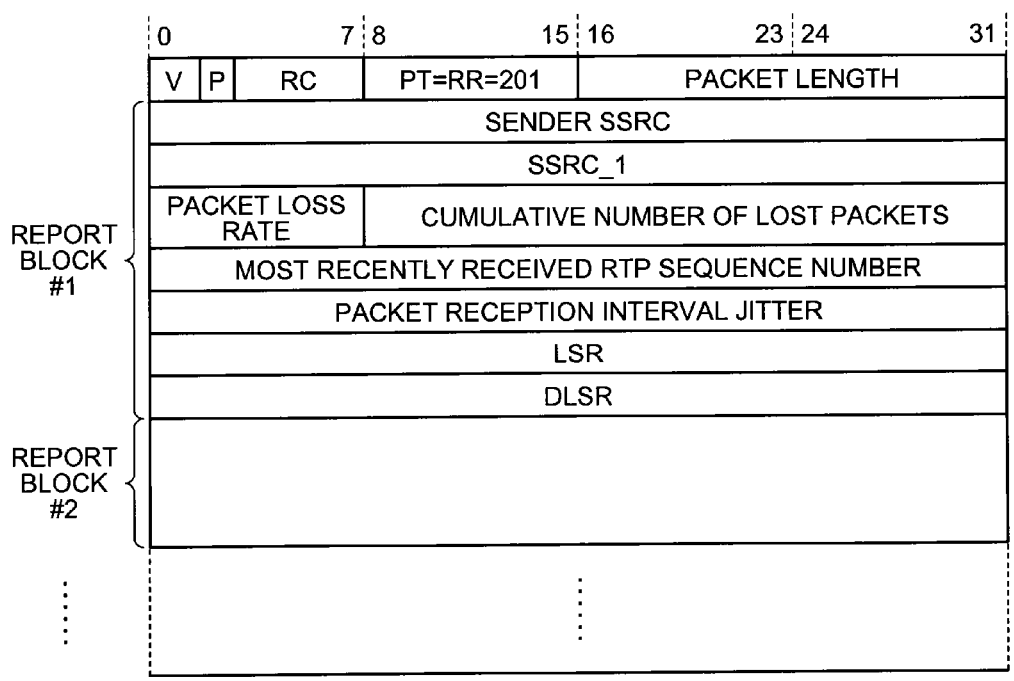
FIG. 5 is an illustration showing an example of a format of a Receiver Report packet of RTCP.

FIG. 5 is an illustration showing an example of format of the RTCP Receiver Report packet. In the Receiver Report packet, zero or more report block(s) is(are) stored behind the RTCP header section. As shown in FIG. 5, the RTCP header section is composed of V (Version number) indicating the protocol version, P (Padding) indicative of the presence or absence of padding, RC (Reception Report Count) indicating the number of report blocks included in the packet, PT (Packet Type) indicative of the packet type, the packet length, and the sender SSRC (synchronization source identifier). For the Receiver Report packet, "201" which indicates RR (Receiver Report) is stored in the PT.

On the other hand, the report block #i (i is an integer equal to one or greater indicating a report block number) is composed of SSRC_i (SSRC to be reported corresponding to the i-th report block), the packet loss rate, the number of cumulative lost packets, the most recently received RTP sequence number, the packet reception interval jitter, the LSR (Last SR (Sender Report) timestamp), and DLSR (Delay since Last SR).

As with the Receiver Report packet, the RTCP Sender Report packet includes zero or more report block(s) and has the same report block format as that of the Receiver Report packet.

The band adjustment section 25 passes the band determined in the step S21 to the session control section 22, and the session control section 22 sends, to the SIP server 1, an UPDATE message for changing the band to be reported to the band having been determined by the band adjustment section 25 (step S22). FIG. 6 is an illustration showing an example of the UPDATE message of the SIP. In the UPDATE message shown in FIG. 6, "b=AS:200" on the lowermost step indicates the report band which has been changed, and in this example, requires the change into 200 kbps.

In this way, this embodiment is intended to dynamically change the report band for the call control network 4 based on the packet loss rate. Accordingly, since the band of the communication channel allocated for the RTP communication can be expanded even if the packet loss rate has increased, it is possible to avoid discarding the RTP communication packet in the call control network 4.

Upon reception of the UPDATE message, the SIP server 1 reserves the required band based on the UPDATE message and then transfers the UPDATE message to the gateway unit 2-2 (step S23). The gateway unit 2-2 reserves the required band based on the UPDATE message and then sends the "200 OK" response to the SIP server 1 (step S24). Upon reception of the "200 OK" response from the gateway unit 2-2, the SIP server 1 sends the "200 OK" response to the gateway unit 2-1 (step S25).

Subsequently, the RTP and RTCP (RTP Control Protocol) communication is performed again between the terminal 3-1 and the terminal 3-2 by way of the gateway unit 2-1, the SIP server 1, and the gateway unit 2-2 (step S26). At this time, as in the step S21, the gateway unit 2-1 determines the band to be reported based on the packet loss rate included in the packet being relayed, and as in the step S22, requests change into the determined band using the UPDATE message. Note that the report band may not be changed depending on the value of the packet loss rate.

Figure 7:
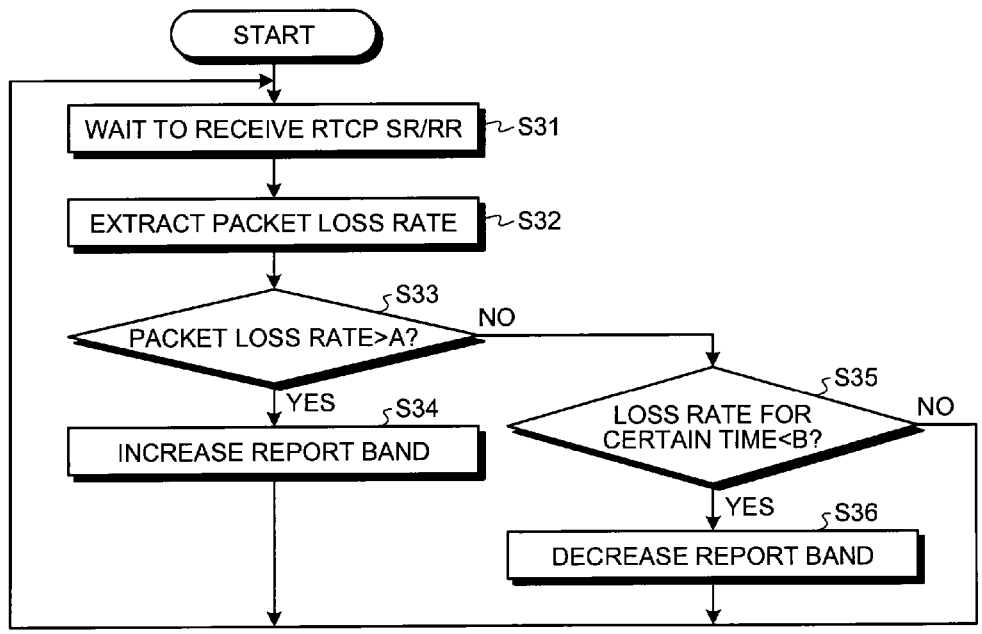
FIG. 7 is a flowchart showing an example of a method for updating a report band in the first embodiment.

FIG. 7 is a flowchart showing an example of a method for updating a report band according to this embodiment. First, the packet analysis section 24 waits to receive the RTCP Sender Report packet or Receiver Report packet (step S31). Then, upon reception of the RTCP Sender Report packet or Receiver Report packet, the packet analysis section 24 extracts the packet loss rate from the received RTCP packet (step S32), and outputs the extracted packet loss rate to the band adjustment section 25.

The band adjustment section 25 determines whether or not the packet loss rate is greater than a certain value "A" (step S33). If it is determined that the packet loss rate is greater than "A" (Yes in the step S33), the band adjustment section 25 increases the report band (step S34), and returns to the step S31. More specifically, the band adjustment section 25 determines the band having been increased to become greater than the band currently being reported as the resulting changed band and then notifies the session control section 22 of the determined band, and then the session control section 22 creates an UPDATE message based on the after-notified band and sends the UPDATE message to the SIP server 1. Note that any method can be employed to increase the report band, including, for example, a method of increasing the band at a predetermined ratio with respect to the band value currently being reported, a method of increasing the band by adding a predetermined value to the band currently being reported, and more.

If it is determined that the packet loss rate is equal to or less than "A" (No in the step S34), then the band adjustment section 25 determines whether the packet loss rate is less than a certain value "B" for a certain period of time (step S35). If it is determined that the packet loss rate is less than the certain value "B" for a certain period of time (in the step S35, Yes), then the band adjustment section 25 reduces the report band (step S36) and then returns to the step S31. More specifically, the band adjustment section 25 determines the band obtained by decreasing from the band currently being reported as the resulting changed band and then notifies the session control section 22 of the determined band, and then the session control section 22 creates an UPDATE message based on the after-notified band and sends the UPDATE message to the SIP server 1. Note that any method can be employed to reduce the report band, including, for example, a method of reducing the band at a predetermined ratio with respect to the band value currently being reported, a method of reducing the band by subtracting a predetermined value from the band currently being reported, and more.

If it is determined that the packet loss rate is not less than the certain value "B" for a certain period of time (the duration in which the packet loss rate is less than the certain value "B" is shorter than a certain time) (No in the step S35), the report band is not changed and the process returns to the step S31.

Note that although in the example shown in FIG. 7, the packet loss rate is extracted every time the RTCP Receiver Report packet or Sender Report packet is received, and the processing from the step S32 onward is performed, the processing from the step S31 onward may be performed for each predetermined period of time in the case where the Receiver Report packet or the Sender Report packet is sent with a relatively-high frequency, or in some other case like that.

On the other hand, for example, in the case where the packet loss rate varies a great deal in a short term, in the case where frequent changes in band are not preferable or in some other case like them, the packet analysis section 24 extracts and holds the packet loss rate each time the Receiver Report packet or the Sender Report packet is received. Then, when a predetermined number of packet loss rates are held, the held packet loss rates may be used to perform statistical processing such as averaging operation, and the resulting packet loss rate may be outputted to the band adjustment section 25.

On the other hand, in this embodiment, if it is determined that the packet loss rate is less than the certain value "B" for a certain period of time, the band to be reported is reduced. However, when it is undesirable to reduce the band for the reason of requirements of an employed application and/or system, any processing to reduce the band to be reported not have to be implemented.

Note that this embodiment is configured such that the band value to be reported to the call control network 4 is increased when a packet loss rate in the RTCP Sender Report packet and Receiver Report packet is equal to or greater than a certain value. However, there may be a case where decrease in the packet loss rate can not be observed in a certain period of time owing to the effects of packet loss outside the call control network 4 and the like. For this reason, when decrease in the packet loss rate can not be observed in a certain period of time after the report band is increased, it may be determined that there is a packet loss outside the call control network 4, and the band value to be reported to the call control network 4 may be reported again as the previous value before having been increased.

Note that in this embodiment, there has been provided an example in which the packet loss rate stored in the RTCP Sender Report packet and Receiver Report packet is used to detect excess or shortage of the band value for the RTP communication. However, without being limited to the example, the transmitted octet number stored in the RTCP Sender Report packet may be used to determine the band to be reported. For example, a plurality of Sender Report packets may be used to calculate the transmitted octet number in a predetermined unit time and thereby determine the required band value, and the resulting value may be reported in the UPDATE message to the call control network 4.

Furthermore, in this embodiment, there has been provided an example in which communication between the terminal 3-1 and the terminal 3-2 is the RTP and RTCP communication. However, the communication to which this embodiment is applied is not limited to the RTP and RTCP communication. For example, if such communication is adopted that the gateway unit 2 can analyze the contents of a relay packet thereby to obtain information relating to the excess or shortage of the band value for a communication flow to be subjected to the session control substitution, such as statistical information on a communication flow to be subjected to the session control substitution, informed in NetFlow (registered trade mark), then the gateway unit 2 can determine the changed band based on the obtained information and change the report band as in this embodiment.

Furthermore, in this embodiment, such a case has been shown in which the SIP is used as the session control protocol. However, without being limited thereto, any control protocol may be employed so long as that control protocol, for example, like H.323 or MEdia GAteway COntrol (MEGACO), can provide session control and session management on an IP network in the same manner as with the SIP. If a control protocol other than the SIP is employed, then, as in this embodiment, the band to be changed may be determined, and the report band corresponding to the control protocol employed may be updated to change the report band.

As described above, in this embodiment, when the gateway unit 2-1 substitutively performs session control processing for the terminal 3-1 incompatible with session control and relays a packet to be subjected to the substitutive session control, the packet analysis section 24 extracts the packet loss rate extracted from the packet being relayed, and the band adjustment section 25 determines the updated value of the band to be reported based on the packet loss rate. Thus, the band value required for communication between the existing terminals to be subjected to the session control can be appropriately reported to the call control network 4.

Second Embodiment

Figure 8:
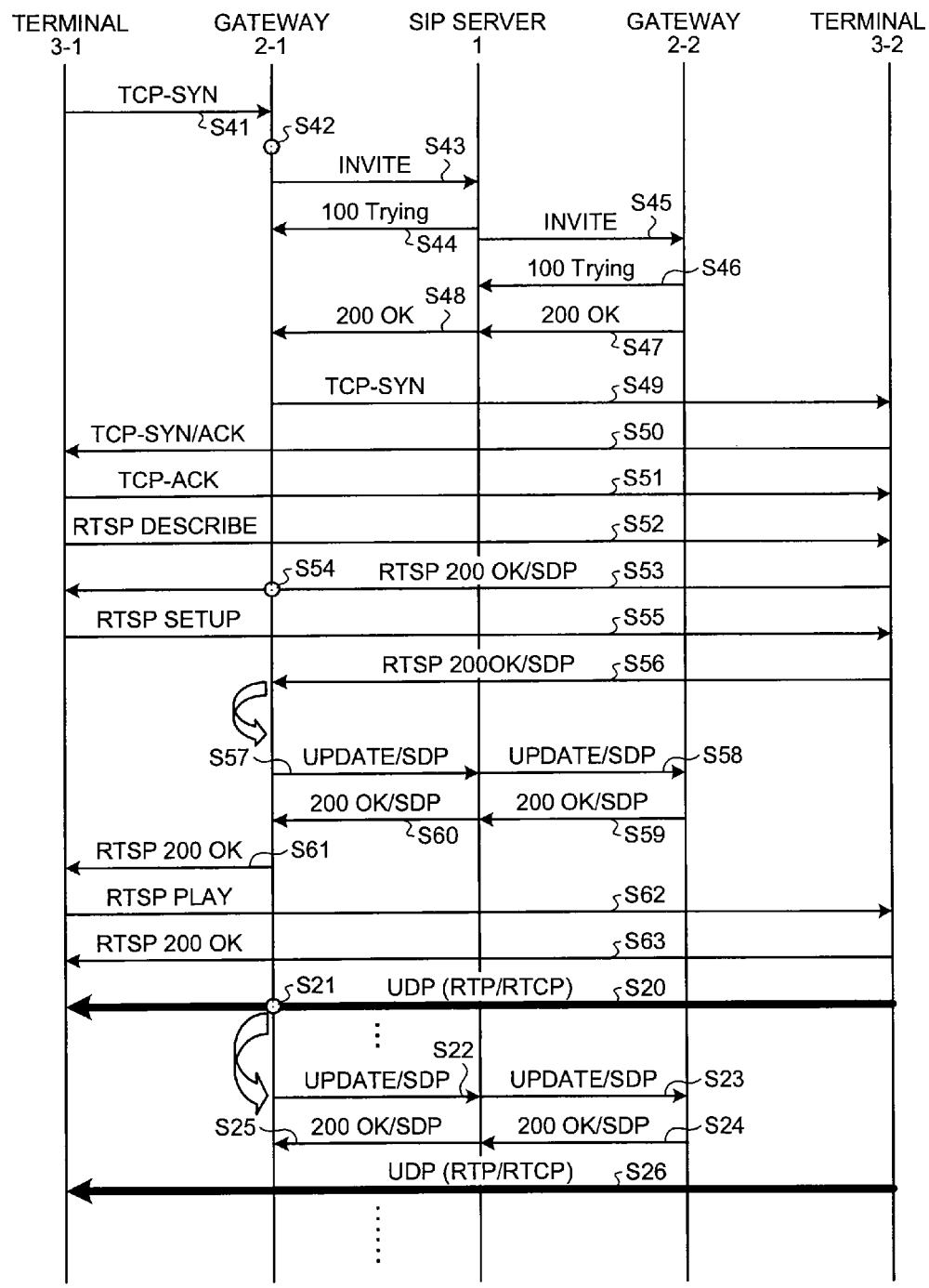
FIG. 8 is a sequence diagram illustrating an example of a communication procedure according to a second embodiment.

FIG. 8 is a sequence diagram illustrating an example of a communication procedure of a second embodiment of a communication system according to the present invention. The configuration of the communication system according to this embodiment is the same as that of the communication system of the first embodiment, while the configuration of the gateway unit of this embodiment is the same as that of the gateway unit according to the first embodiment. In the following description, an element having the same function as an element in the first embodiment is denoted with the same symbol as that of the first embodiment. However, the session information table 23 in this embodiment is partly different from the session information table 23 of the first embodiment. The session information table 23 of this embodiment will be discussed later.

In the first embodiment, such a case has been described in which the RTP and RTCP communication is performed between the terminal 3-1 and the terminal 3-2. On the other hand, after the Real Time Streaming Protocol (RTSP) communication is carried out to establish a communication channel in the RTSP communication prior to RTP and RTCP communication, the RTP and RTCP communication may be performed. In this embodiment, description will be given for the case where the RTSP communication is performed to establish a communication channel in this manner, and subsequently the RTP and RTCP communication is performed.

First, the terminal 3-1 sends, to the terminal 3-2, a TCP-SYN packet indicative of the start of communication (communication start packet) by RTSP (RTSP communication) (step S41). Upon reception of the TCP-SYN packet (communication start packet) from the terminal 3-1, the packet relay section 21 of the gateway unit 2-1 suspends the relay of the packet and passes the packet to the session control section 22. The session control section 22 extracts, from the communication start packet, flow information such as the sender IP address, the destination IP address, the protocol, the sender port number, and the destination port number, and then refers to the session information table 23 to acquire the session control parameters corresponding to the extracted flow information (step S42). The session control section 22 creates an INVITE message serving as a call connection request based on the acquired session control parameters and then sends the created INVITE message to the SIP server 1 (step S43).

Upon reception of the INVITE message, the SIP server 1 sends, back to the gateway unit 2-1 (step S44), a provisional response "100 Trying" which indicates that processing for establishing a session is being carried out, and then transfers the received INVITE message to the gateway unit 2-2 connected to the terminal 3-2 that is a destination in the communication (step S45). The gateway unit 2-2 sends the "100 Trying" back to the SIP server 1 (step S46).

When the session establishment processing has been successfully completed, the gateway unit 2-2 sends the "200 OK" response to the SIP server 1 (step S47), and then, upon reception of the "200 OK" response from the gateway unit 2-2, the SIP server 1 sends the "200 OK" response to the gateway unit 2-1 (step S48).

Upon detection of the establishment of a communication channel by receiving the "200 OK" response transmitted from the SIP server 1 in the step S47, the session control section 22 of the gateway unit 2-1 commands the packet relay section 21 to restart the relay processing of packets, and then the packet relay section 21 transfers the suspended TCP-SYN packet to the terminal 3-2 (step S49).

Upon reception of the TCP-SYN packet, the terminal 3-2 sends a TCP-SYN/ACK that is a response thereto back to the terminal 3-1 (step S50). Upon reception of the TCP-SYN/ACK, the terminal 3-1 sends back a TCP-ACK (step S51). Through the procedures above, a TCP connection for an RTSP control channel is established between the terminal 3-1 and the terminal 3-2.

When the TCP connection for an RTSP control channel is established, the terminal 3-1 sends an "RTSP DESCRIBE" message which requests to acquire information, such as the media type or the band, on the data sent by the terminal 3-2 (step S52). Upon reception of the "RTSP DESCRIBE" message, the terminal 3-2 sends a "RTSP 200 OK" response which includes information such as the media type or the band that are described by SDP (step S53).

In the step S53, the packet relay section 21 of the gateway unit 2-1 relays the "RTSP 200 OK" response. At this time, the packet relay section 21 passes, to the packet analysis section 24, the packet of the "RTSP 200 OK" response being relayed. The packet analysis section 24 extracts a QoS parameter required for session control from the information, which is described by the SDP and included in the packet of the "RTSP 200 OK" response, and then holds the QoS parameter (step S54). The QoS parameters required for the session control are, for example, the band information, the media type, and the attribute.

FIG. 9 is an illustration showing an example of the "RTSP DESCRIBE" message, and FIG. 10 is an illustration showing an example of the response thereto or the "RTSP 200 OK" response. As shown in FIG. 10, the row including "b=" shows the band, the row including "m=" shows the media type, and the row including "a=" shows the attribute.

Upon reception of the "RTSP 200 OK" response, the terminal 3-1 sends an "RTSP SETUP" message (step S55). Upon reception of the "RTSP SETUP" message, the terminal 3-2 sends the "RTSP 200 OK" response including the information described by the SDP to the terminal 3-1 (step S56).

Upon reception of the "RTSP 200 OK" response, the packet relay section 21 of the gateway unit 2-1 suspends the relay and passes the "RTSP 200 OK" response to the packet analysis section 24. The packet analysis section 24 extracts a QoS parameter of the QoS parameters held from the SDP description portion of the "RTSP 200 OK" response, the QoS parameter corresponding to the communication required to be set in the "RTSP SETUP" message in the step S41, and then passes the extracted QoS parameter to the session control section 22. The session control section 22 creates an UPDATE message based on the QoS parameter received from the packet analysis section 24 and then sends the created UPDATE message to the SIP server 1 (step S57).

Upon reception of the UPDATE message, the SIP server 1 reserves the required band based on the UPDATE message, and then transfers the UPDATE message to the gateway unit 2-2 (step S58). The gateway unit 2-2 reserves the required band based on the UPDATE message, and then sends the "200 OK" response to the SIP server 1 (step S59). Upon reception of the "200 OK" response from the gateway unit 2-2, the SIP server 1 sends the "200 OK" response to the gateway unit 2-1 (step S60).

Upon reception of the "200 OK" response, the packet relay section 21 of the gateway unit 2-1 sends, to the terminal 3-1, the "RTSP 200 OK" response that has been suspended from being relayed (step S61). Then, the terminal 3-1 sends an "RTSP PLAY" message as the start of the communication in which SETUP has been requested in the step S55 (step S62), and the terminal 3-2 sends back the "RTSP 200 OK" (step S63). From this point onward, streaming communication can be performed between the terminal 3-1 and the terminal 3-2.

Herein, assuming that the streaming communication is performed by RTP/RTCP between the terminal 3-1 and the terminal 3-2, the streaming communication is carried out after the step S63. The operation of this embodiment during the streaming communication is the same as that in the step S20 to the step S26 according to the first embodiment. The operation of this embodiment other than those described above is the same as that of the first embodiment.

In the first embodiment, the gateway unit 2-1 has to hold an initial value of the band information relating to the RTP/RTCP communication as a session control parameter in the session information table. In contrast to this, in this embodiment, since the UPDATE message is transmitted based on the band information included in the "RTSP 200 OK" response using an RTSP control channel before the RTP/RTCP communication is started, the session information table 23 does not need to hold the initial value of the band information relating to the RTP/RTCP communication. However, the gateway unit 2-1 holds the initial value of the band information relating to the control channel of the RTSP communication.

As described above, this embodiment is configured such that the gateway unit 2-1 which substitutively performs session control processing for the terminal 3-1 incompatible with session control creates an UPDATE message and reserves the band for the RTSP communication based on the band information included in the "RTSP 200 OK" response that is a response to the "RTSP DESCRIBE" message. This provides the same effects as those of the first embodiment, and when compared with the conventional cases, can reduce the amount of information which the gateway unit 2-1 holds for the RTP/RTCP communication as session control parameter.

Third Embodiment

Figure 11:
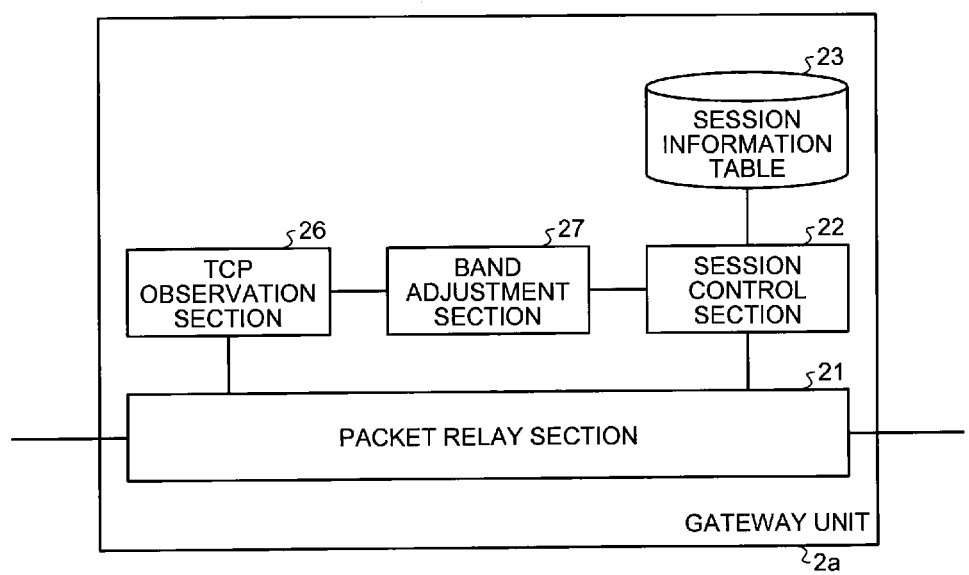
FIG. 11 is a diagram illustrating an example of functional construction of a gateway unit according to a third embodiment.

FIG. 11 is a diagram illustrating an example of functional construction of a third embodiment of a gateway unit 2a according to the present invention. The gateway unit 2a of this embodiment is the same as the gateway unit 2 of the first embodiment except that a TCP observation section 26 and a band adjustment section 27 are provided in place of the packet analysis section 24 and band adjustment section 25 of the first embodiment. The configuration of the communication system of this embodiment is the same as that of the communication system of the first embodiment (see FIG. 1) except that the gateway unit 2-1 and the gateway unit 2-2 are replaced with a gateway unit 2a-1 and a gateway unit 2a-2 which are each configured as shown in FIG. 11.

The TCP observation section 26 observes TCP communication to be subjected to session control so as to extract the reception window size from a TCP packet and measure a Round Trip Time (RTT). The band adjustment section 27 determines the band required for the TCP communication being subjected to session control based on the reception window size and the RTT.

Figure 12:
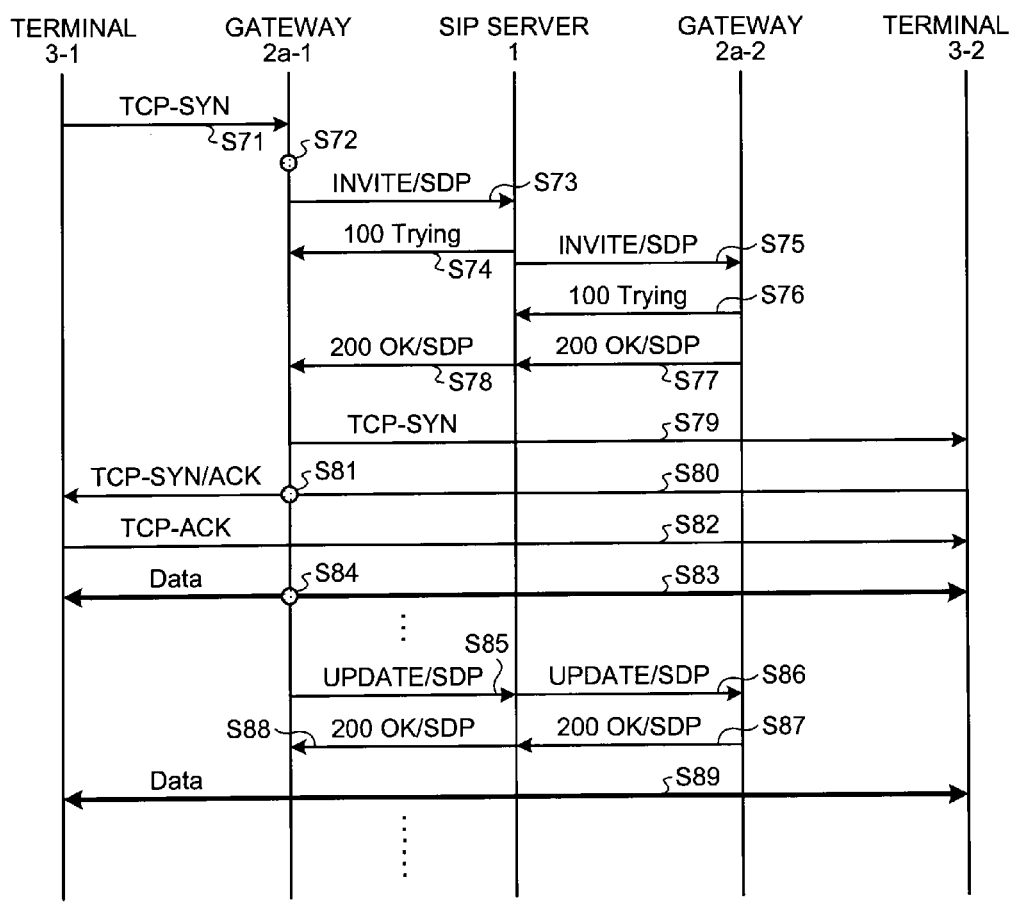
FIG. 12 is a sequence diagram illustrating an example of communication procedure according to the third embodiment.

Now, description will be given for the operation of this embodiment. FIG. 12 is a sequence diagram illustrating an example of the communication procedure for a communication system of this embodiment. Here, description will be given for TCP communication which the terminal 3-1 performs with the terminal 3-2.

The terminal 3-1 sends a TCP-SYN packet (step S71). The packet relay section 21 of the gateway unit 2a-1 suspends the relay of the received TCP-SYN packet and then passes the TCP-SYN packet to the session control section 22. The session control section 22 extracts flow information such as the sender IP address, the destination IP address, the protocol, the sender port number, the destination port number from the TCP-SYN packet, and referring to the session information table 23, acquires a session control parameter corresponding to the extracted flow information (step S72). Based on the acquired session control parameter, the session control section 22 creates an INVITE message that is a call connection request and then sends the created INVITE message to the SIP server 1 (step S73).

A step S74 to a step S80 that follow are the same as the step S44 to the step S50 in the second embodiment. The packet relay section 21 of the gateway unit 2a-1 relays the TCP-SYN/ACK packet in the step S80 and passes the TCP-SYN/ACK packet to the TCP observation section 26. The TCP observation section 26 extracts from the TCP-SYN/ACK packet and holds the TCP reception window size and the window scale option (step S81).

FIG. 13 is an illustration showing an example of header format of a TCP packet. The example of FIG. 13 shows the case of employing a window scale option specified in Request For Comments (RFC) 1323 of Internet Engineering Task Force (IETF). The part from the head of FIG. 13 to the emergency pointer is a standard header, and the part from an item "Kind=2" onward shows an optional field. The part from the third item "Kind=3" from the last of FIG. 3 onward shows a window scale option, an item "Length=3" indicates an option field length thereof, and an item "shift count" shows a value by which the window size value is bit-shifted.

The standard TCP packet header can only represent a window size up to 65535 bytes at a maximum. Thus, the RFC 1323 bit-shifts the window size value for a window scale option to thereby make it possible to set the maximum window size to a value greater than 65535 bytes. It is thus possible to determine the actual window size using the window size included in the standard header part (the TCP reception window size) and this shift count. Note that if no window scale option is used, then the TCP reception window size may be determined based on the value of the window size included in the header of the TCP packet.

Referring back to FIG. 12, the description will be continued. Upon reception of the TCP-SYN/ACK packet, the terminal 3-1 sends the TCP-ACK packet to the terminal 3-2 (step S82). Through the process above, a TCP 3-way handshake between the terminal 3-1 and the terminal 3-2 is completed, and data are transmitted and received between the terminal 3-1 and the terminal 3-2 (step S83).

During the transmission and reception of data in the step S83, the gateway unit 2a-1 allows the packet relay section 21 to send the received data and at the same time, to pass the received data to the TCP observation section 26, while the TCP observation section 26 observes the TCP traffic (step S84). More specifically, the TCP observation section 26 extracts the TCP reception window size of the terminal 3-2 side from the TCP-ACK packet transmitted from the terminal 3-2 to the terminal 3-1 in the TCP traffic. Furthermore, in the TCP traffic, the TCP observation section 26 measures the RTT based on the TCP packet transmitted from the terminal 3-1 to the terminal 3-2 and a TCP ACK packet that is transmitted from the terminal 3-2 to the terminal 3-1 in response thereto. The TCP observation section 26 passes the window scale option being held, the TCP reception window size extracted, and the measured RTT to the band adjustment section 27.

Then, the gateway unit 2a-1 allows the band adjustment section 27 to determine the maximum band based on the window scale option, the TCP reception window size and the RTT, and when the maximum band is greater than the band having been reported in the step S73, determines a value obtained by increasing from the reported band value as the resulting changed band value. Furthermore, if the maximum band is less than the reported band and a difference between the reported band and the maximum band is greater than a predetermined value X, then the band adjustment section 27 determines a value obtained by decreasing from the reported band value, as the resulting changed band value. Then, the band adjustment section 27 passes the resulting changed band value to the session control section 22. The session control section 22 creates an UPDATE message which reflects, as a band to be reported, the resulting changed band value received from the band adjustment section 27, and sends the created UPDATE message to the SIP server 1 (step S85). The processing in the step S86 to the step S88 that follow is the same as that in the step S23 to the step S25 of the first embodiment.

After the step S88, data are continually transmitted and received (step S89). In the same manner as in the step 84, the gateway unit 2a-1 observes the TCP traffic, so as to perform the same processing as in the step S85 to the step S88 to thereby change the band to be reported when the maximum band is greater than the reported band or when the maximum band is less than the reported band and a difference between the reported band and the maximum band is greater than the predetermined value X. The operation of this embodiment other than those mentioned above is the same as that of the first embodiment.

Figure 14:
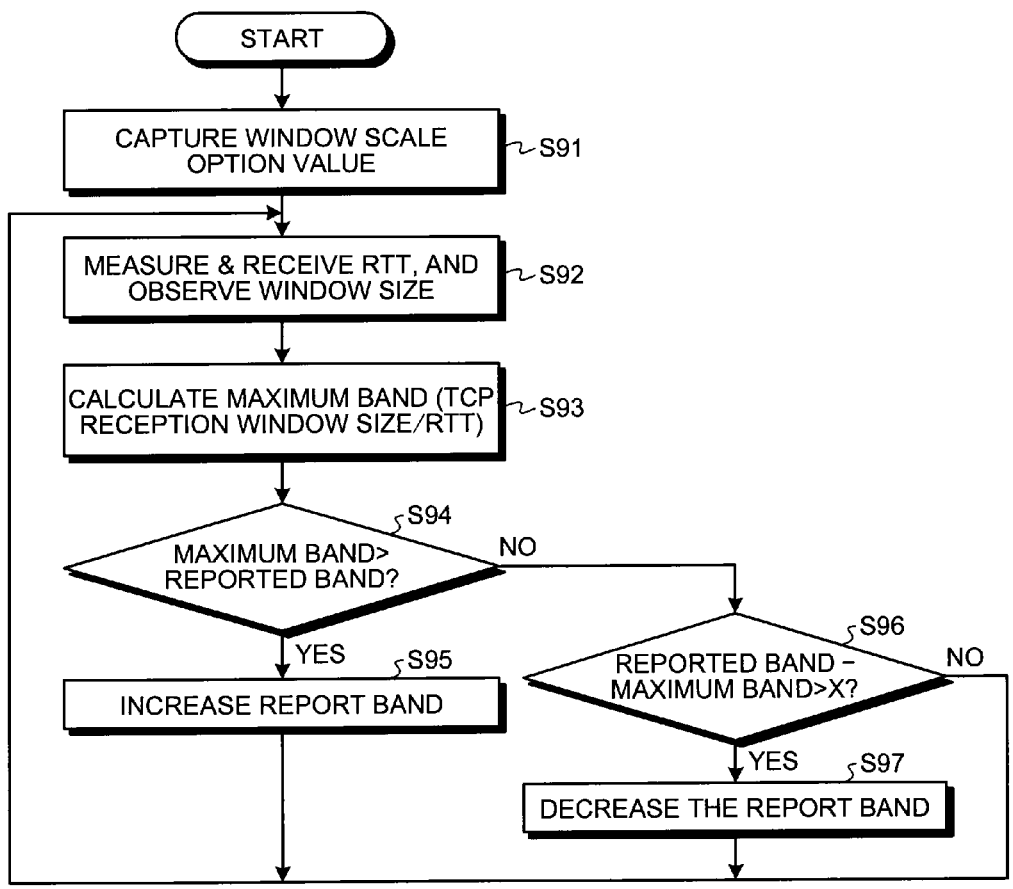
FIG. 14 is a flowchart showing an example of a method for updating a report band according to the third embodiment.

Now, a method for updating the report band of the gateway unit 2a-1 will be described in detail. FIG. 14 is a flowchart showing an example of a method for updating a report band according to this embodiment. The TCP observation section 26 receives, from the packet relay section 21, the TCP-SYN/ACK packet provided when TCP connection is established between the terminal 3-1 and the terminal 3-2 and then extracts from the TCP-SYN/ACK packet and holds therein the value of the window scale option (step S91).

Then, the TCP observation section 26 measures the RTT based on the TCP packet transmitted from the terminal 3-1 to the terminal 3-2 in the TCP connection and the TCP ACK packet that is transmitted from the terminal 3-2 to the terminal 3-1 in response to the TCP packet (step S92). Furthermore, at this time, the TCP observation section 26 extracts the window size value included in the TCP ACK packet transmitted from the terminal 3-2 (step S92).

The TCP observation section 26 calculates the maximum band based on the window scale option value being held, the extracted window size value, and the measured RTT (step S93). More specifically, based on the window scale option value and the window size value, the maximum band is determined as "the maximum band =TCP reception window size/RTT."

The TCP observation section 26 determines whether or not the maximum band is greater than the band having been reported to the call control network 4 (step S94). Note that the TCP observation section 26 is assumed to have acquired from the session control section 22 and held the band having been reported to the call control network 4. If the maximum band is greater than the reported band (Yes in the step S94), then the TCP observation section 26 determines a value obtained by increasing from the reported band as the resulting changed band and then passes the resulting changed band to the session control section 22 (step S95). The session control section 22 creates an UPDATE message based on the resulting changed band and then sends the created UPDATE message to the SIP server 1 (step S95), and returns to the step S92.

If the maximum band is equal to or less than the reported band (No in the step S94), then the TCP observation section 26 determines whether or not a difference between the reported band and the maximum band is greater than the predetermined value X (step S96). If the difference between the reported band and the maximum band is greater than the predetermined value X (Yes in the step S96), then the TCP observation section 26 determines a value obtained by decreasing from the reported band as the resulting changed band and then passes the resulting changed band to the session control section 22 (step S97). The session control section 22 creates an UPDATE message based on the resulting changed band and then sends the created UPDATE message to the SIP server 1 (step S97), and returns to the step S92.

On the other hand, if the difference between the reported band and the maximum band is not greater than the predetermined value X (No in the step S96), the band to be reported is not changed, and the process returns to the step S92.

Any method may be employed to determine the resulting changed band in the step S95 and the step S97. For example, a method for defining the determined maximum band as the resulting changed band may be employed. Without being limited to this method, it may also be acceptable to determine the resulting changed band by increasing (decreasing for the step S97) the reported band at a certain rate or by adding (subtracting for the step S97) a certain value to(from) the reported band.

Note that this embodiment is configured such that the band to be reported is reduced if the difference between the reported band and the maximum band is greater than the predetermined value X. However, when it is undesirable to reduce the band because of the requirement of the application or system being employed, no processing for reducing the band to be reported may be carried out.

Note that the aforementioned example has illustrated a method for updating the band value on the TCP connection creating side (the gateway unit 2a-1). Likewise, the TCP connection receiving side (the gateway unit 2a-2) may change the band to be reported, based on the TCP reception window size and the RTT of the opposing TCP node (the terminal 3-1). By performing the same processing in the TCP connection receiving side, it is possible to establish a communication channel to which an appropriate band is bidirectionally allocated according to the maximum band.

On the other hand, the band value to be first reported to the call control network 4 may also be a fixed value irrespective of the flow information. In this case, the gateway unit can reduce the information relating to the band value in the session information table, that is to be held.

As described above, in this embodiment, the TCP observation section 26 extracts the window scale option from the TCP-SYN/ACK packet at the time of establishment of the TCP connection, extracts the window size value included in the TCP ACK packet transmitted from the terminal 3-2, and further measures the RTT based on the packet transmitted between the terminal 3-1 and the terminal 3-2. Then, the TCP observation section 26 calculates the resulting changed band in accordance with the maximum band determined based on the window scale option, the window size value and the RTT, and the session control section 22 reports the resulting changed band to the call control network 4. Thus, in the case of performing TCP communication, the band value required for communication between the existing terminals to be subjected to session control can be appropriately reported to the call control network 4.

Fourth Embodiment

Figure 15:
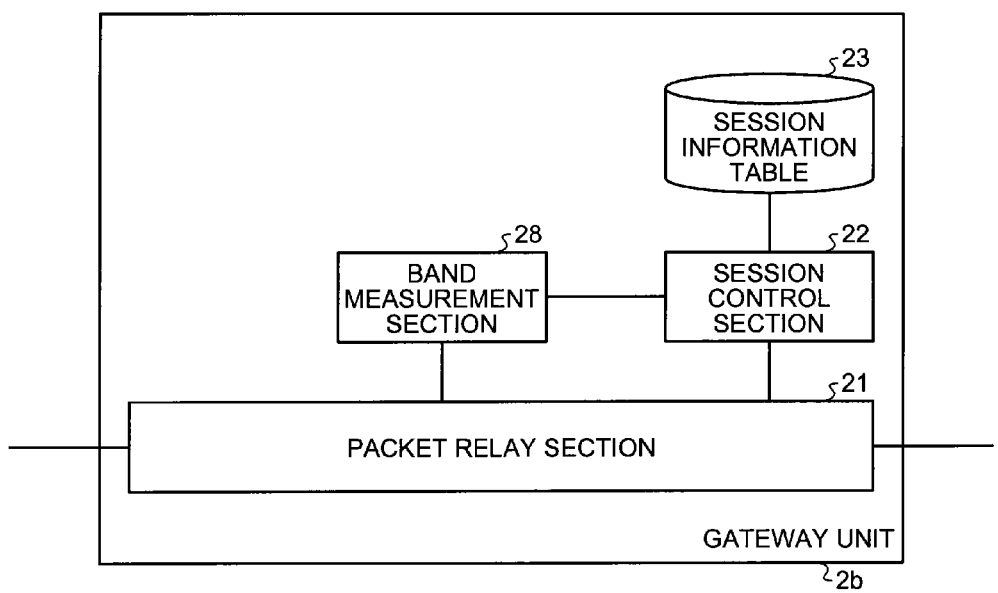
FIG. 15 is a diagram illustrating an example of functional construction of a gateway unit according to a fourth embodiment.

FIG. 15 is a diagram illustrating an example of functional construction of a fourth embodiment of a gateway unit 2b according to the present invention. The gateway unit 2b of this embodiment is the same as the gateway unit 2 of the first embodiment except that a band measurement section 28 is provided in place of the packet analysis section 24 and the band adjustment section 25 of the first embodiment. The configuration of a communication system of this embodiment is the same as the communication system of the first embodiment (see FIG. 1) except that the gateway unit 2-1 and the gateway unit 2-2 are replaced with a gateway unit 2b-1 and a gateway unit 2b-2 which are each configured as shown in FIG. 15.

The band measurement section 28 measures a communication band (transmission band) of the communication to be subjected to session control. Any method may be employed to measure the transmission band, including, as an example, a method in which the band measurement section 28 accumulates the amount of data of the communication being subjected to substitutive session control, relayed in a the packet relay section 21 within a predetermined unit time, and divides the accumulated amount of data by the unit time, thereby to measure the transmission band. The band measurement section 28 determines the transmission band measured in this manner as an updated value for the band to be reported to the call control network 4, and thus functions as the band adjustment means like the band adjustment section 25 of the first embodiment.

Figure 16:
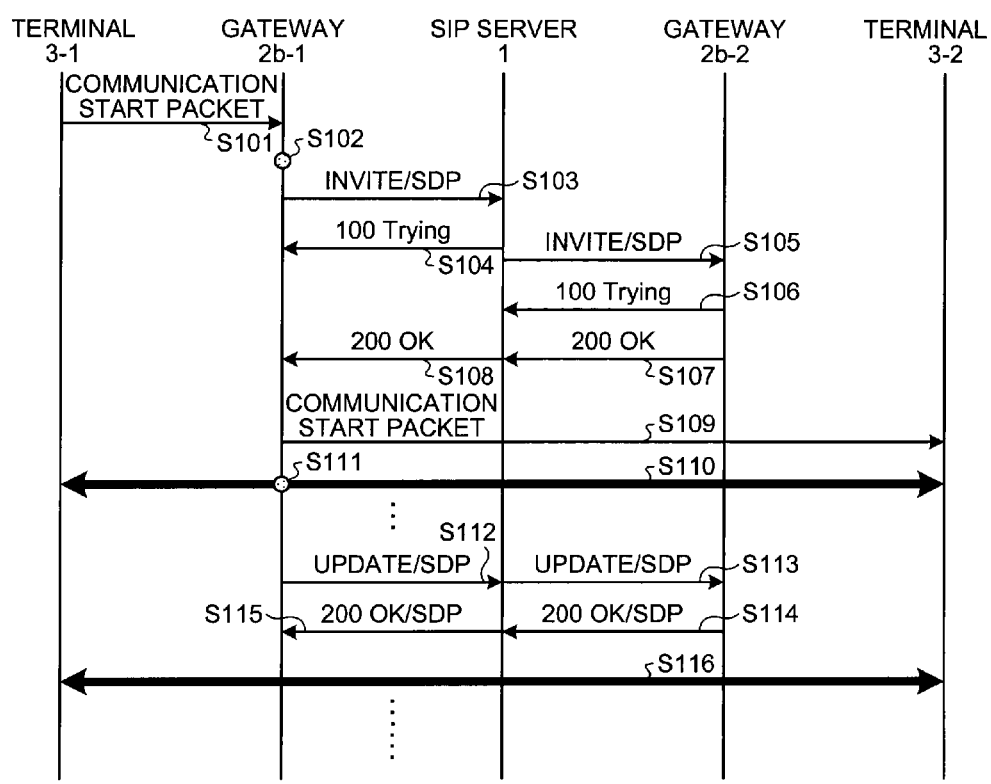
FIG. 16 is a sequence diagram illustrating an example of communication procedure according to the fourth embodiment.

Now, description will be given for the operation of this embodiment. FIG. 16 is a sequence diagram illustrating an example of the communication procedure of the communication system of this embodiment. Here, such an example will be described in which the terminal 3-1 commences communication to communicate with the terminal 3-2. Note that any type of communication can be employed for this communication so long as the communication serves to send packets which include the flow information to be mentioned below and the like. For example, use may be made of the TCP communication or the UDP communication.

First, the terminal 3-1 sends a communication start packet which is an initial packet for communication with the terminal 3-2 (step S101). In the gateway unit 2b-1, upon reception of the communication start packet from the terminal 3-1, the packet relay section 21 suspends the relay of the packet and holds the packet as well as passes the packet to the session control section 22. The session control section 22 extracts, from the received communication start packet, information corresponding to the flow condition such as the sender IP address, the destination IP address, the protocol, the sender port number and the destination port number, retrieves the flow condition which matches the information extracted based on the session information table 23, and acquires the session control parameter corresponding to the flow condition obtained by the retrieval (step S102).

From this point onward, processing of a step S103 to a step S108 is performed in the same manner as in the step S13 to the step S18 of the first embodiment. When having detected the establishment of a communication channel by receiving a "200 OK" response transmitted in the step S108 from the SIP server 1, the session control section 22 of the gateway unit 2b-1 commands the packet relay section 21 to restart the relay processing of the packet, and the packet relay section 21 transfers the suspended packet (the packet transmitted in the step S101) to the terminal 3-2 (step S109).

Subsequently, communication is conducted between the terminal 3-1 and the terminal 3-2 (step S110). At this time, in the gateway unit 2b-1, the packet relay section 21 relays communication packets between the terminal 3-1 and the terminal 3-2, while the band measurement section 28 measures the transmission band (the transmission band from the terminal 3-1) based on the communication packets and informs the session control section 22 of the resulting band (step S111).

The session control section 22 of the gateway unit 2b-1 creates an UPDATE message for which the transmission band noticed from the band measurement section 28 is used as the band to be reported, and then sends the created UPDATE message to the SIP server 1 (step S112). From this point onward, a step S113 to a step S115 are performed in the same manner as in the step S23 to the step S25 of the first embodiment. This allows a communication channel, to which the band according to the communication is allocated, to be established on the call control network 4. The terminal 3-1 and the terminal 3-2 continue the communication (step S116), and meanwhile in the same manner as mentioned above, the band measurement section 28 measures the transmission band based on the communication packet, and the session control section 22 sends the UPDATE message based on the transmission band. The operation of this embodiment other than those described above is the same as that of the first embodiment.

Note that when the measured transmission band is not different from the reported band or when a difference between the measured transmission band and the reported band is within a predetermined range, the UPDATE message based on the transmission band may not be transmitted.

Furthermore, the band measurement section 28 may also measure the transmission band at every predetermined time interval. Furthermore, the band measurement section 28 may perform statistical processing or the like such as averaging using a plurality of measured transmission bands and then pass the after-processing transmission band to the session control section 22.

Furthermore, the aforementioned example has illustrated a method in which the communication start side (the gateway unit 2b-1) measures a transmission band and then updates a band. However, even the communication reception side (the gateway unit 2b-2) may also measure a transmission band (transmission band from the terminal 3-2) in the same manner and then update a band to be reported based on the transmission band. By allowing also the reception side to perform the same processing, it is possible to establish a communication channel to which bidirectionally appropriate bands are respectively allocated according to the maximum band.

In addition, when the band value to be first reported to the call control network 4 may further be a fixed value irrespective of the flow information, the gateway unit can reduce the information relating to the band value in the session information table to be held.

As described above, in this embodiment, the band measurement section 28 of the gateway unit 2b-1 measures the transmission band based on the relayed communication packet, while the session control section 22 sends the UPDATE message for updating the band to be reported to the call control network 4 based on the transmission band. It is thus possible to provide the same effects as those of the first embodiment without analyzing the contents of the communication packet.

Industrial Applicability

As described above, the gateway unit, the communication system, and the communication method according to the present invention are useful for a communication system which includes a gateway unit for substitutively performing the session control processing of a terminal, and in particular, suitable for a communication system which handles communications under a wide variety of flow conditions.

REFERENCE SIGNS LIST

1 SIP SERVER
2, 2-1, 2-2, 2a, 2a-1, 2a-2, 2b-1, 2b-2 GATEWAY UNIT
3-1, 3-2 TERMINAL

4 CALL CONTROL NETWORK
5-1, 5-2 USER NETWORK
21 PACKET RELAY SECTION
22 SESSION CONTROL SECTION
23 SESSION INFORMATION TABLE
24 PACKET ANALYSIS SECTION
25, 27 BAND ADJUSTMENT SECTION
26 TCP OBSERVATION SECTION
28 BAND MEASUREMENT SECTION

The invention claimed is:

1. A gateway for connecting a call control network for performing call control and a terminal having no call control function to relay communication between the call control network and the terminal, the gateway comprising:
circuitry configured to:
substitutively perform call control processing in call control communication, using Real-time Transport Protocol (RTP) and RTP Control Protocol (RTCP), that is communication performed by the terminal by way of the call control network, and reporting a band required by the call control communication to the call control network;
determine an updated value of the band of the call control communication based on a communication packet in the call control communication, received from the terminal;
perform packet analysis by extracting predetermined information included in the communication packet, the information including a packet loss rate included in a Receiver Report packet or a Sender Report packet; and
report the updated value to the call control network as an updated band required by the call control communication,
wherein the determining the updated value based on the information is such that the updated value is greater than the reported band when the packet loss rate is greater than a predetermined upper limit threshold value.

2. The gateway according to claim 1, wherein the determining the updated value is such that the updated value is less than the reported band when the packet loss rate is less than a predetermined lower limit threshold value for a certain period of time.

3. The gateway according to claim 2, wherein
the call control communication further includes communication using Real Time Streaming Protocol (RTSP), and a communication channel for RTP and RTSP is established using RTSP prior to communication using RTP and RTCP;
the performed packet analysis further extracts band information included in a communication packet of RTSP, and
the determining the updated value further employs the band information as the updated value.

4. The gateway according to claim 1, wherein
the call control communication is communication using Transmission Control Protocol (TCP), and
the the circuitry is further configured to:
perform TCP observation for measuring a round-trip delay time based on a TCP packet in the call control communication and a response packet to the TCP packet and extracting a reception-side window size from the response packet, and
determine a maximum band based on the round-trip delay time and the reception-side window size and determine the updated value based on the maximum band.

5. The gateway according to claim 4, wherein
the circuitry is further configured to:
extract window scale option information from a TCP packet transmitted in establishment of TCP connection in the call control communication, and
further determine a value of the maximum band based on the window scale option information.

6. The gateway according to claim 1, wherein
the circuitry is further configured to:
measure the communication band based on the communication packet in the call control communication and regard the communication band as the updated value.

7. The gateway according claim 1, wherein
the call control processing is processing using Session Initiation Protocol (SIP), and
the the circuitry is further configured to use an UPDATE message to report the updated value to the call control network as the band required by the call control communication.

8. A communication system comprising a call control network for performing call control, a terminal having no call control function, and a gateway for relaying communication between the call control network and the terminal,
wherein the gateway includes circuitry configured to:
substitutively perform call control processing in call control communication, using Real-time Transport Protocol (RTP) and RTP Control Protocol (RTCP), that is communication performed by the terminal by way of the call control network, and reporting a band required by the call control communication to the call control network;
determine an updated value of the band of the call control communication based on a communication packet in the call control communication, received from the terminal;
perform packet analysis by extracting predetermined information included in the communication packet, the information including a packet loss rate included in a Receiver Report packet or a Sender Report packet; and
report the updated value to the call control network as an updated band required by the call control communication,
wherein the determining the updated value based on the information is such that the updated value is greater than a reported band when the packet loss rate is greater than a predetermined upper limit threshold value.

9. A communication method for a gateway, which connects a call control network for performing call control and a terminal having no call control function and relays communication between the call control network and the terminal, the communication method comprising:
substitutively performing, using circuitry, call control processing in call control communication, using Real-time Transport Protocol (RTP) and RTP Control Protocol (RTCP), that is communication performed by the terminal by way of the call control network, and reporting a band required by the call control communication to the call control network;
perform, using the circuitry, packet analysis for extracting predetermined information included in a communication packet in the call control communication, received from the terminal, the information including a packet loss rate included in a Receiver Report packet or a Sender Report packet;
determine, using the circuitry, an updated value of the band of the call control communication based on the information, such that the updated value is greater than a reported band when the packet loss rate is greater than a predetermined upper limit threshold value; and report, using the circuitry, the updated value to the call control network as an updated band required by the call control communication.

\* \* \* \* \*